March 27, 1951     W. D. BELL     2,546,292
CUTTING TOOL
Filed Aug. 30, 1946
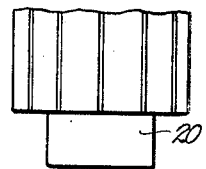
Fig. 1.
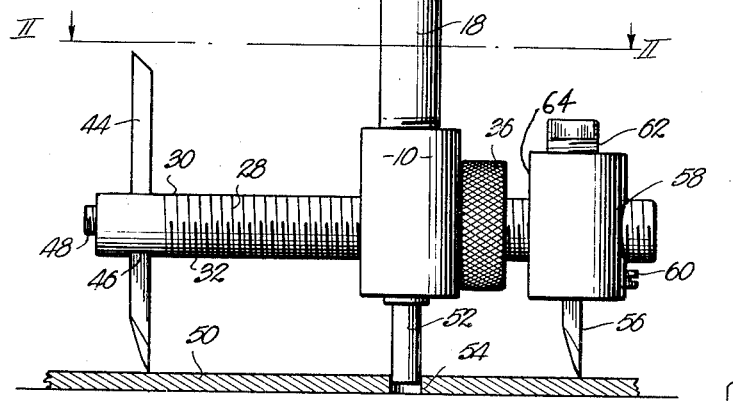
Fig. 2.
Fig. 4.
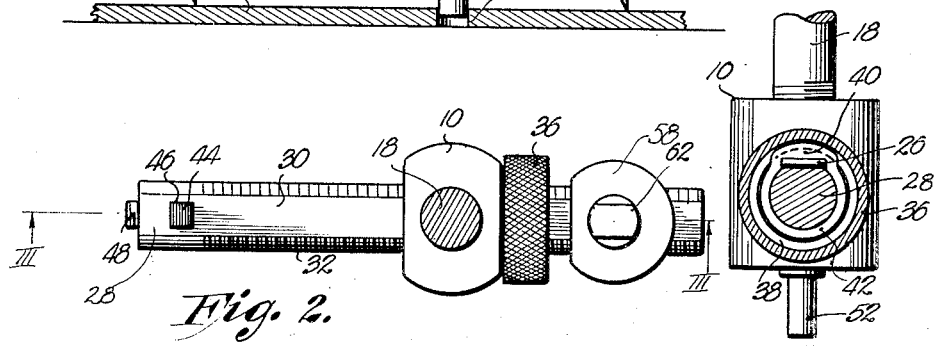
Fig. 3.
INVENTOR.
William D. Bell
BY
ATTORNEY.

Patented Mar. 27, 1951

2,546,292

UNITED STATES PATENT OFFICE 2,546,292

CUTTING TOOL

William D. Bell, Kansas City, Mo.

Application August 30, 1946, Serial No. 694,034

2 Claims. (Cl. 164—71)

This invention relates to machine tools of the character usually employed in combination with a power driven machine and has for its prime aim the provision of a disk or ring cutting instrument embodying novel and unique means for adjusting the blade of the tool to obtain rings or disks of different diameters without removing the tool from its operative position.

One of the important objects of this invention is to provide a cutting tool of the aforementioned character wherein is included a uniquely formed supporting block designed to operably maintain an adjusting screw in place to hold a blade in the operative position with respect to the material being treated, which screw is so contoured as to permit fine longitudinal movement with respect to the supporting block and that has a portion thereon engageable by a pressure plate for preventing rotation thereof about its axis.

Other aims of the invention are to provide a cutting tool for disk or circular objects, said tool including a manually manipulable collar mounted on the aforesaid block and arranged to engage the aforesaid screw to adjust the same longitudinally as the block is carried by a shank, the character whereof is designed to mount the entire cutting tool assembly in a chuck of a drill press or like machine.

Other objects of the invention are numerous and important. Said objects will appear during the course of the following specification referring to the accompanying drawing wherein:

Fig. 1 is a side elevational view of the cutting tool made pursuant to the instant invention and illustrating the same in the operative position in a drill press.

Fig. 2 is a sectional view taken on line II—II of Fig. 1 looking in the direction of the arrow.

Fig. 3 is a sectional view taken along line III—III of Fig. 2; and

Fig. 4 is a sectional view taken on line IV—IV of Fig. 3.

It has heretofore been difficult to accurately set cutting blades in drill presses for the purpose of forming disks or rings without removing the cutting tool assembly and adjusting the clamping elements individually and separately from the chuck per se. The cutting tool embodying the preferred form of the invention and chosen for illustration is capable of quick adjustment, positive and rigid securement of the component parts thereof and may be moved to and from a position in a drill press with speed and despatch.

In the cutting tool illustrated, the numeral 10 designates a block having a bore 12 formed therethrough and a bore 14 extending inwardly from one end thereof to communication with said bore 12. The latter bore 14 has internal threads 16 formed on the wall thereof to receive similar threads of a shank 18, one end whereof is designed to enter bore 14 while the opposite end portion thereof is intended for insertion in a chuck 20 of a conventional drill press or similar machine. The threaded end of shank 18 has a socket 22 provided therein to receive a pintle 24 extending laterally from a pressure plate 26. This pressure plate 26 rests in a portion of bore 12 having a flat upper surface and a pair of parallel flat sides between which pressure plate 26 is disposed. This portion of bore 12 is to one side of the substantially round part thereof, which receives screw 28.

Screw 28 has a planar area 30 formed along the normally upper portion thereof to immediately underlie and come into frictional engagement with pressure plate 26. That portion of screw 28, not including the flat upper surface 30, is threaded as at 32 to engage the internal threads 34 of a follower nut 36. This nut is specially designed as illustrated in Fig. 3 to rotatably engage block 10 and has an annular flange 38 which overhangs arcuate lip 40 integral with block 10.

This lip is developed along the edge of a boss 42 which extends into nut 36 in a manner illustrated in Fig. 3 and therefore, since arcuate lip 40 is less than one-half the length of the periphery of boss 42, nut 36 may be easily assembled with block 10 and screw 28 when screw 28 has been shifted to a point where nut 36 may be withdrawn from the end of the screw. Under such arrangement, when nut 36 is rotated, it will shift screw 28 longitudinally to move the cutter blade 44 toward and from the axis of shank 18, which is the axis of rotation of the entire assembly when the same is in chuck 20.

Cutter blade 44 is held in place by passing the same through a transverse opening 46 in screw 28 and thereafter moving a set screw 48 against blade 44 to maintain the same in a place where the cutting point is in engagement with the work 50. When blade 44 has been located, shank 18 is tightened down against pressure plate 26, which in turn is moved tightly against the flat surface 30 of screw 28. The "lead" of the screw threads which inter-connect block 10 and shank 18 is so related to the direction of rotation of chuck 20 that as the said chuck is rotated, shank 18 is progressively tightened. Thus, as blade 44 is moved through its desired path of travel, the grip upon screw 28 is increased to insure a positive action without maladjustment.

A centering pin 52 carried by block 10 is in axial alignment with shank 18 and enters opening 54 formed in the work 50. Normally, the blade 44 is adjusted to cut the outside periphery of a washer or ring to be formed, and a blade 56 is set, to cut the inside wall thereof. This blade 56 is held in place by inserting the same into an opening formed in the lowermost wall of a secondary block 58 and thereafter moving a set screw 60 against the blade 56 to maintain the same in place where the cutting point is in engagement with the work 50. This block 58 has a central bore therethrough for receiving the end of screw 28 that projects from the block 10 opposite to the blade 44, and a bolt 62 screw-threaded into an opening in block 58 in opposed relation to blade 56 is moved against the flat surface 30 for holding the block 58 in place.

The block 58 has a flat face 64 similar to the opposed flat faces of the block 10 to permit moving the same as close as possible to the nut 36 to cut relatively small rings or washers. Obviously, the blade 56 may be used to cut the outer edge of the ring and the blade 44 the inner edge if desired, especially when a small ring is desired, since the blade 44 will move closer to the block 10 than the blade 58. When a change of adjustment is desired, block 10 is turned upon shank 18 to cause the end of the shank to release its grip upon pressure plate 26 after which nut 36 may be manipulated to draw screw 28 to the desired station.

It is understood that cutting tools having physical characteristics grossly different from those illustrated and described may be made without departing from the spirit of the invention or scope of the appended claims.

Having thus described my invention, what I claim as new and desire to secure by Letters Patent is:

1. A cutting tool of the kind described comprising a block having a pair of intersecting bores formed therethrough; a screw extending through one of the bores; a nut rotatably supported by the block and in threaded engagement with the screw for moving the block along the screw upon manipulation of the nut; a cutter blade carried by the screw near one end thereof; and a shank in the other bore of the block adapted to mount the tool in the chuck of a drill press or the like, said shank and the block being in screw-threaded engagement for moving the shank into tight engagement with the screw upon relative rotation of the shank and the block, said screw being provided with a flat face thereon for engagement with the shank, said shank having a pressure plate loosely mounted at the end thereof adjacent to the screw, said plate extending outwardly from the shank along the flat face of the screw.

2. A cutting tool of the kind described comprising a block having a pair of intersecting bores formed therethrough; a screw extending through one of the bores; a nut rotatably supported by the block and in threaded engagement with the screw for moving the block along the screw upon manipulation of the nut; a cutter blade carried by the screw near one end thereof; and a shank in the other bore of the block adapted to mount the tool in the chuck of a drill press or the like, said shank and the block being in screw-threaded engagement for moving the shank into tight engagement with the screw upon relative rotation of the shank and the block, said screw being provided with a flat face thereon for engagement with the shank, said shank having a pressure plate loosely mounted at the end thereof adjacent to the screw, said plate extending outwardly from the shank along the flat face of the screw, said pressure having a pintle thereon, said shank having an axial socket provided therein for receiving the pintle and precluding displacement of the pressure plate.

WILLIAM D. BELL.

REFERENCES CITED

The following references are of record in the file of this patent:

UNITED STATES PATENTS

| Number | Name | Date |
| --- | --- | --- |
| 1,353,526 | Frengle | Sept. 21, 1920 |
| 1,559,084 | Gaillard | Oct. 27, 1925 |
| 1,924,777 | Hall | Aug. 29, 1933 |
| 2,269,510 | Bates | Jan. 13, 1942 |